United States Patent
Jan

(10) Patent No.: US 7,274,650 B2
(45) Date of Patent: Sep. 25, 2007

(54) RODENT REPELLENT DEVICE OF RANDOM WORKING FREQUENCY

(76) Inventor: Te-Chin Jan, 8 F., No. 21, Lane 120, Sec. 1, Neihu Rd., Neihu District, Taipei City 114 (TW)

( * ) Notice: Subject to any disclaimer, the term of this patent is extended or adjusted under 35 U.S.C. 154(b) by 127 days.

(21) Appl. No.: 11/156,724

(22) Filed: Jun. 21, 2005

(65) Prior Publication Data
US 2006/0262648 A1 Nov. 23, 2006

(30) Foreign Application Priority Data
May 17, 2005 (TW) .............................. 94207946 U

(51) Int. Cl.
*H04B 1/02* (2006.01)
(52) U.S. Cl. ..................................... 369/139
(58) Field of Classification Search ................ 367/139; 340/384.2, 384.7; 119/719; 43/124
See application file for complete search history.

(56) References Cited

U.S. PATENT DOCUMENTS

| | | | |
|---|---|---|---|
| 4,366,562 A * | 12/1982 | McGinty | 367/139 |
| 5,205,066 A * | 4/1993 | Jan | 367/139 |
| 6,166,996 A * | 12/2000 | Grissom et al. | 367/139 |
| 6,845,062 B2 * | 1/2005 | Niezrecki et al. | 367/139 |

OTHER PUBLICATIONS

Short; Microprocessors and Programmed Logic; 1981; pp. 12-13.*

* cited by examiner

*Primary Examiner*—Daniel Pihulic
(74) *Attorney, Agent, or Firm*—Troxell Law Office, PLLC

(57) ABSTRACT

A rodent repellent device of random working frequency is disclosed, which comprises: an application-specific integrated circuit (ASIC); a deterring module, electrically connected to the ASIC, capable of emitting a wave emission selected from the group consisting of an ultrasonic wave, a seismic wave and a sound, being used for repelling rodents; and a power source, electrically connected to the ASIC, for providing power to the ASIC and the deterring module. Wherein the ASIC further comprises: an internal precision oscillator; a center processing unit (CPU); a wake-up module, being employed as an activation means for enabling the rodent repellent device to have randomized lasting time of wave emission and randomized intermission between two consecutive wave emissions; a read-only memory (ROM), for storing a program controlling the randomization of each intermission between two consecutive wave emissions and the lasting time of each wave emissions; and a random-access memory (RAM).

7 Claims, 4 Drawing Sheets

RODENT REPELLENT DEVICE OF RANDOM WORKING FREQUENCY

FIELD OF THE INVENTION

The present invention relates to a rodent repellent device of random working frequency, and more particularly, to a rodent repellent device capable of emitting ultrasonic waves or certain sounds by a manner of having randomized lasting time of wave emission and having randomized intermission between two consecutive wave emissions, by which rodents, and especially burrowing rodents, can be repelled effectively since it can not accustomed themselves to the randomized working frequencies of the rodent repellent device. In addition, the application-specific integrated circuit (ASIC) of the rodent repellent device is designed with a sleep module and a wake-up module, which enables the power consumed by the rodent repellent device in each intermission to be a merely 0.38 mA and thus the power consumption of the rodent repellent device can be saved effectively.

BACKGROUND OF THE INVENTION

For many years numerous attempts have been made to keep rodents away from homes, storage bins and other areas. As to farmers and gardeners, it is a specific rodent, i.e. burrowing rodents, that can cause most severe damage to their hard-working result. Burrowing rodents have a pretty diverse diet. They enjoy grass, vegetables and grains, regarding their presence and intentions can spell disaster for your garden or cultivation. One of the most annoying things for homeowners however is the burrows they will dig in your yard and under your outbuildings. A conventional rodent repellent device will emit a certain harassment sounds by a manner of regular lasting and intermission for repelling burrowing rodents digging and living under your garden. But, it is only effective for a relatively short period of time since burrowing rodents can accustom oneself to harassment of regular nature. Yet, neither of these convention rodent repellents have had any long-term success.

In addition, since most conventional rodent repellent devices employ batteries as their power source and it is common to have a rodent repellent device to operate continuously for a long period of time, the overall power consumption could cost a fortune. Therefore, it is needed to have a power-saving rodent repellent device.

SUMMARY OF THE INVENTION

In view of the disadvantages of prior art, the primary object of the present invention is to provide a rodent repellent device of random working frequency, capable of emitting ultrasonic waves, seismic waves or certain sounds by a manner of having randomized lasting time of wave emission and having randomized intermission between two consecutive wave emissions, by which rodents, and especially burrowing rodents, can be repelled effectively since they can not accustom themselves to the randomized working frequencies of the rodent repellent device. In addition, the application-specific integrated circuit (ASIC) of the rodent repellent device is designed with a sleep module and a wake-up module, which enables the power consumed by the rodent repellent device in each intermission to be a merely 0.38 mA and thus the power consumption of the rodent repellent device can be saved effectively.

To achieve the above object, the present invention provides a rodent repellent device of random working frequency, comprising:

an application-specific integrated circuit (ASIC), further comprising:

an internal precision oscillator;
  a center processing unit (CPU);
  a wake-up module, being employed as an activation means for enabling the rodent repellent device to have randomized lasting time of wave emission and randomized intermission between two consecutive wave emissions;
  a read-only memory (ROM), for storing a program controlling the randomization of each intermission between two consecutive wave emissions and the lasting time of each wave emissions; and
  a random-access memory (RAM);

a deterring module, electrically connected to the ASIC, capable of emitting a wave emission selected from the group consisting of an ultrasonic wave and a sound, being used for repelling rodents; and a power source, electrically connected to the ASIC, for providing power to the ASIC and the deterring module.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
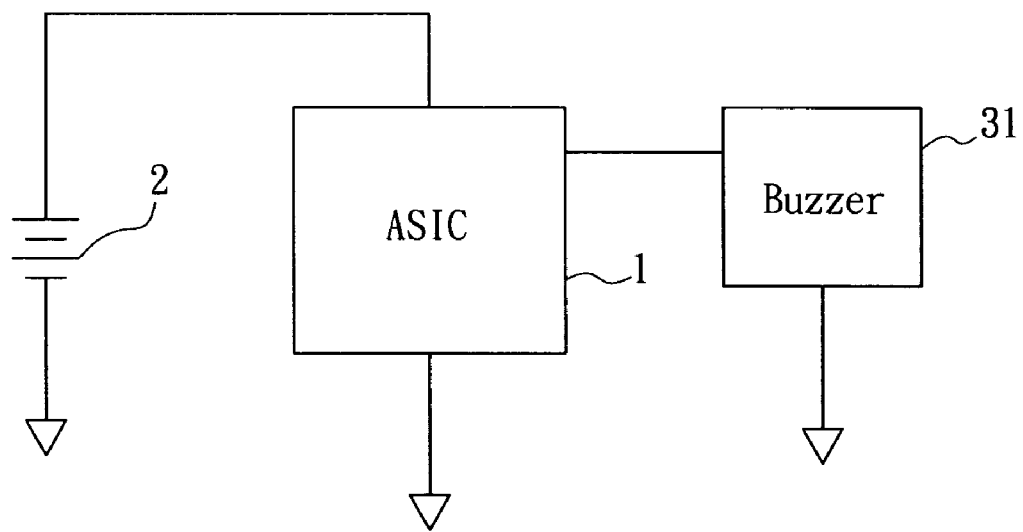
FIG. 1 is a block diagram depicting a rodent repellent device of random working frequency according to a first embodiment of the invention.
Figure 2:
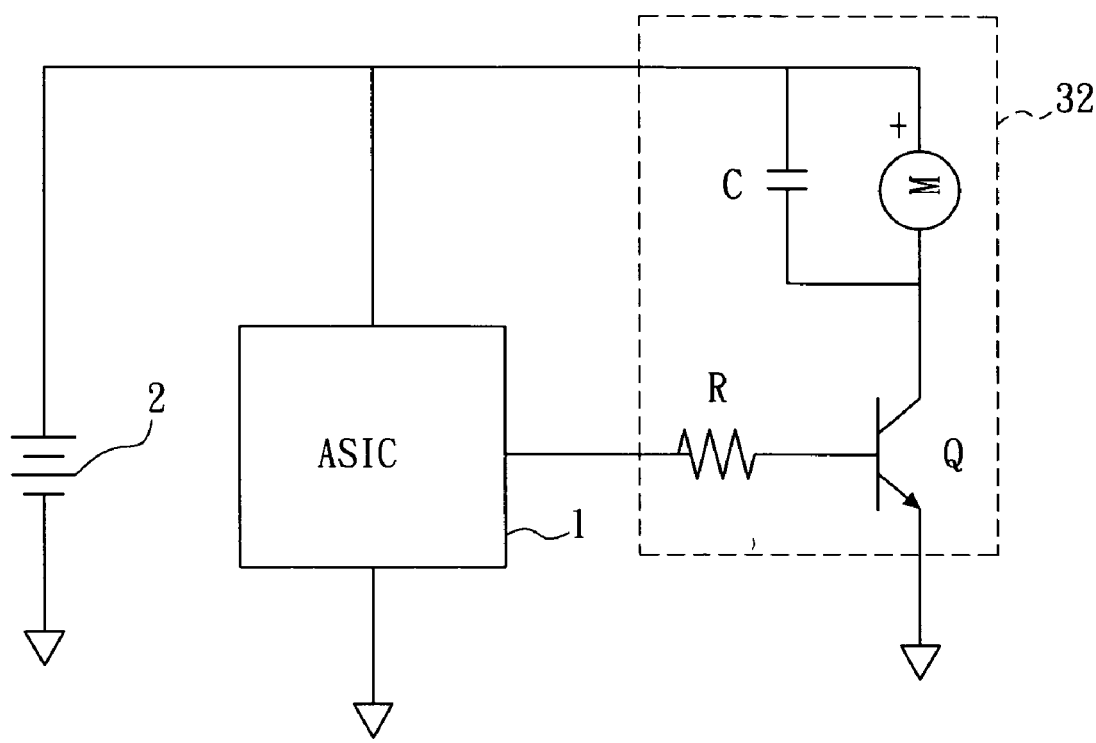
FIG. 2 is a block diagram depicting a rodent repellent device of random working frequency according to a second embodiment of the invention.

Please refer to FIG. 1, which is a block diagram depicting a rodent repellent device of random working frequency according to a first embodiment of the invention. In this preferred embodiment, the casing of the rodent repellent device can be manufactured as a pen-like object, which is advantageous while sticking rodent repellent device into earth. However, the shape of this pen-like rodent repellent device is prior-arts and thus will not be described further hereinafter. The rodent repellent device of FIG. 1 primarily is consisted of an application-specific integrated circuit (ASIC) 1, a power source 2, and a buzzer 31, wherein the ASIC 1 powered by the power source 2 is enabled to drive the buzzer 31 to emit an ultrasonic or sound wave that is unbearable for the burrowing rodents. In FIG. 2, instead of the buzzer 31, the rodent repellent device uses a motor 32 to generate a seismic wave or harassment sound that is intolerable to the burrowing rodents so as to repel the burrowing rodents from a restricted area. However, it is noted that most burrowing rodents can become used to and finally ignore regular harassments so that the conventional rodent repellent device emitting ultrasonic waves, sound waves, noises or seismic waves at a regular manner can only work for a very short period of time. The characteristic of the rodent repellent device of the invention is that: by embedding a random program in the ASIC 1, the rodent repellent device can emit ultrasonic waves, sound waves, noises or seismic waves by a manner of having randomized lasting time of wave emission and having randomized intermission between two consecutive wave emissions while the rodent repellent device is enabled to be either in a mode of wave emission, i.e. operating mode, or in a mode of intermission, i.e. sleeping mode. For instance, the lasting time of each wave emission can be defined within the range of 1 to 4 seconds while each intermission can be defined within the range of 10 to 45 seconds. However, the aforementioned are just a preferable embodiment of the present invention and, of course, can not be used to limit the scope of the present invention. By varying the lasting time of each wave emission and each intermission randomly, most burrowing rodents can not accustom themselves to the irregularity and finally are deterred.

Figure 3:
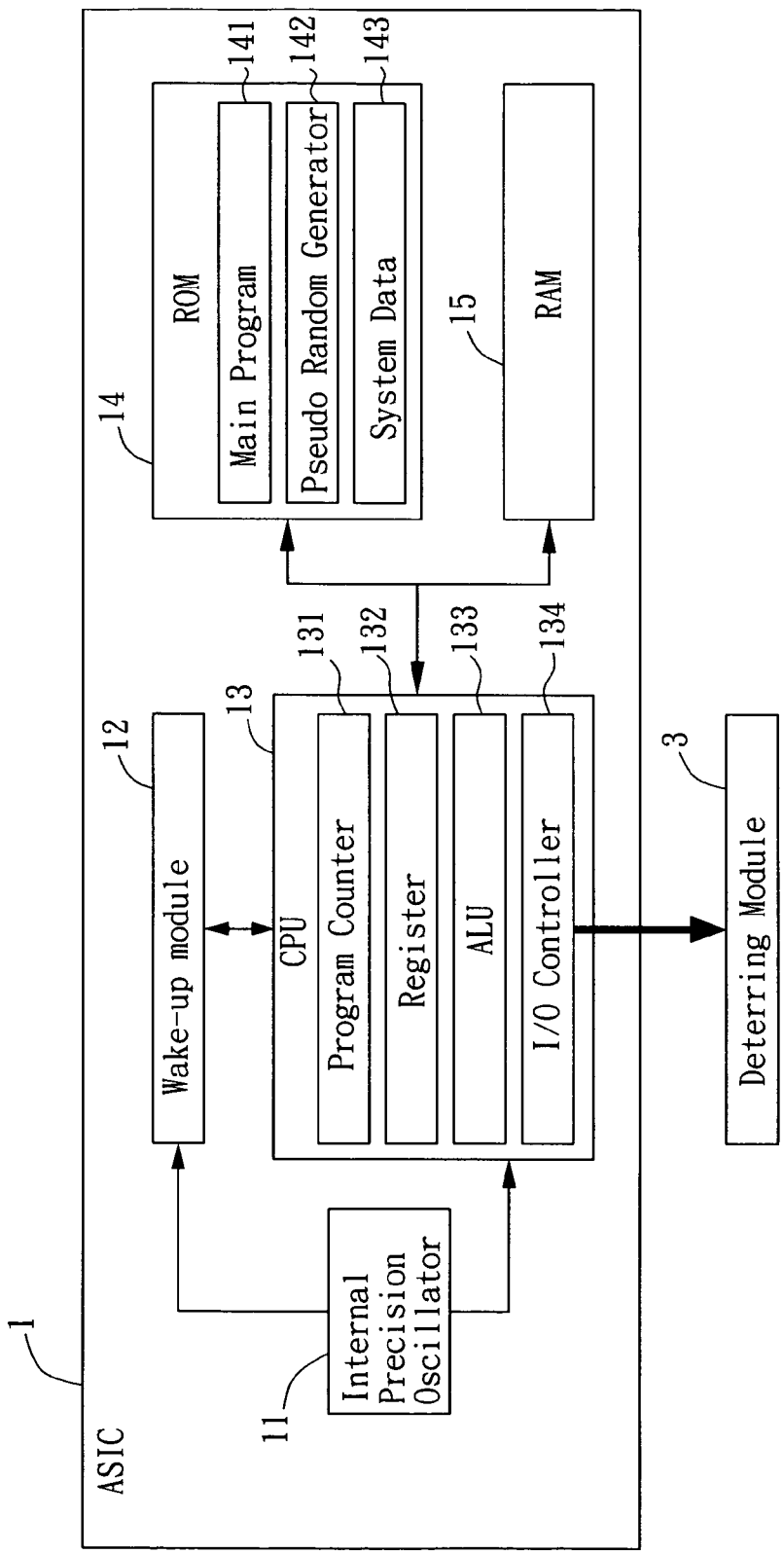
FIG. 3 is a block diagram of the ASIC of a rodent repellent device of random working frequency according to the invention.

Please refer to FIG. 3, which is a block diagram of the ASIC of a rodent repellent device of random working frequency according to the invention. The ASCI 1 shown in FIG. 3 comprises: an internal precision oscillator 11; a center processing unit (CPU) 13; a wake-up module 12, being employed as an activation means for enabling the rodent repellent device to have randomized lasting time of wave emission and randomized intermission between two consecutive wave emissions; a read-only memory (ROM) 14, for storing a program controlling the randomization of each intermission between two consecutive wave emissions and the lasting time of each wave emissions; and a random-access memory (RAM) 15. Furthermore, a main program 141, a pseudo random generator 142 and system data 143 are stored in the read-only memory, wherein the pseudo random generator is used as the program of controlling the randomization of each intermission between two consecutive wave emissions and the lasting time of each wave emissions, and is programmable with respect to various requirement.

In addition, the CPU 13 further comprises a program counter 131, a register 132, an arithmatic and logic unit (ALU) 133 and an input/out controller 134, wherein the input/out controller 134 is electrically connected to a deterring module 3, which can be the buzzer 31 of FIG. 1 or the motor 32 of FIG. 2.

Figure 4:
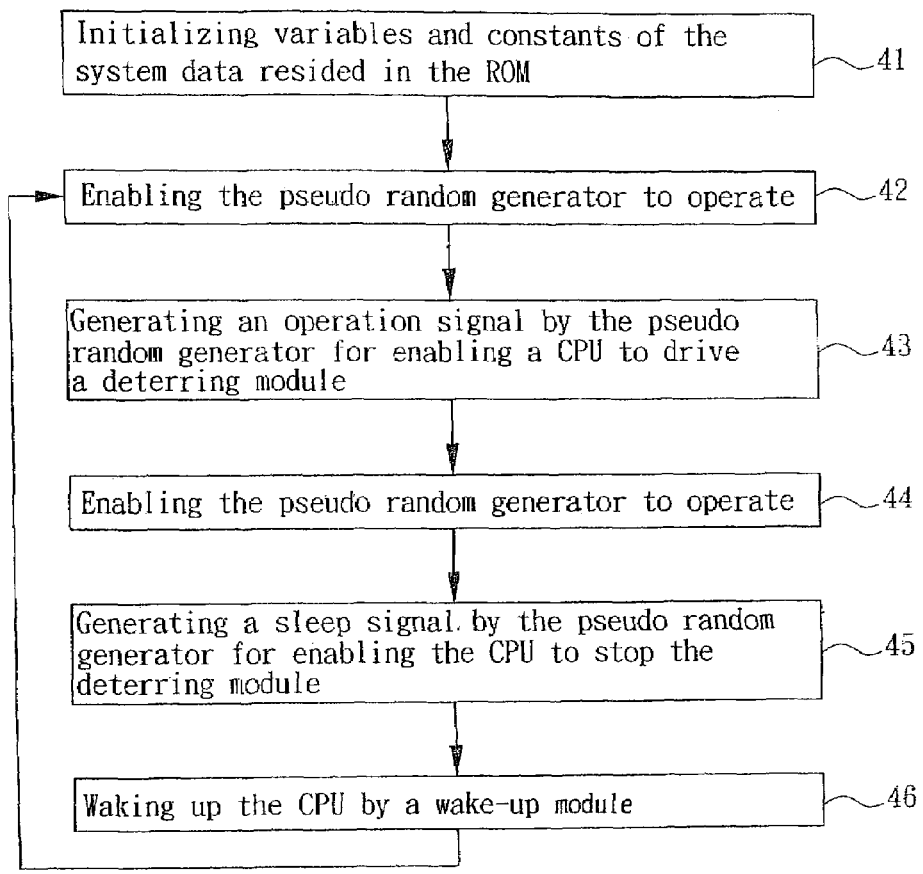
FIG. 4 is a flowchart depicting the operations of the ASIC of the invention.

Please refer to FIG. 4, which is a flowchart depicting the operations of the ASIC 1 of the invention. The program controlling the operation of the ASIC is stored in the pseudo random generator 143 embedded in the ROM 14, that the operation of the ASIC 1 comprises the steps of:

41 initializing variables and constants of the system data 143 resided in the ROM 14;
42 enabling the pseudo random generator 142 to operate for the first time;
43 generating an operation signal by the pseudo random generator 142 for enabling the CPU 13 to drive the deterring module 3;
44 enabling the pseudo random generator 142 to operate for the second time;
45 generating a sleep signal by the pseudo random generator 142 for enabling the CPU 13 to stop the deterring module 3;
46 waking up the CPU 13 by the wake-up module 12, and thereafter the process proceeding to step 42.

To sum up, the present invention provides a rodent repellent device of random working frequency, capable of emitting ultrasonic waves, seismic waves or certain sounds by a manner of having randomized lasting time of wave emission and having randomized intermission between two consecutive wave emissions, by which rodents, and especially burrowing rodents, can be repelled effectively since they can not accustom themselves to the randomized working frequencies of the rodent repellent device. In addition, the application-specific integrated circuit (ASIC) of the rodent repellent device is designed with a sleep module and a wake-up module, which enables the power consumed by the rodent repellent device in each intermission to be a merely 0.38 mA and thus the power consumption of the rodent repellent device can be saved effectively.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A rodent repellent device of random working frequency, comprising:
   an application-specific integrated circuit (ASIC), further comprising:
      an internal precision oscillator;
      a center processing unit (CPU);
      a wake-up module, being employed as an activation means for enabling the rodent repellent device to have randomized lasting time of wave emission and randomized intermission between two consecutive wave emissions;
      a read-only memory (ROM), for storing a program controlling the randomization of each intermission between two consecutive wave emissions and the lasting time of each wave emissions; and
      a random-access memory (RAM);
   a deterring module, electrically connected to the ASIC, capable of emitting a wave emission selected from the group consisting of an ultrasonic wave, a seismic wave and a sound, the deterring module being configured to be located underground so as to repel burrowing rodents; and
   a power source, electrically connected to the ASIC, for providing power to the ASIC and a buzzer/motor module.

2. The rodent repellent device of claim 1, wherein a main program, a pseudo random generator and system data are stored in the read-only memory.

3. The rodent repellent device of claim 2, wherein the pseudo random generator is used as the program of controlling the randomization of each intermission between two consecutive wave emissions and the lasting time of each wave emissions, and is programmable with respect to various requirement.

4. The rodent repellent device of claim 1, wherein the deterring module capable of emitting ultrasonic sound waves is a buzzer.

5. The rodent repellent device of claim 1, wherein the deterring module capable of emitting seismic waves is a motor.

6. The rodent repellent device of claim 1, wherein the center processing unit further comprises a program counter, a register, an arithmatic and logic unit (ALU) and an input/output controller.

7. The rodent repellent device of claim 6, wherein the input/output controller is electrically connected to the deterring module.

* * * * *